Figure 1:
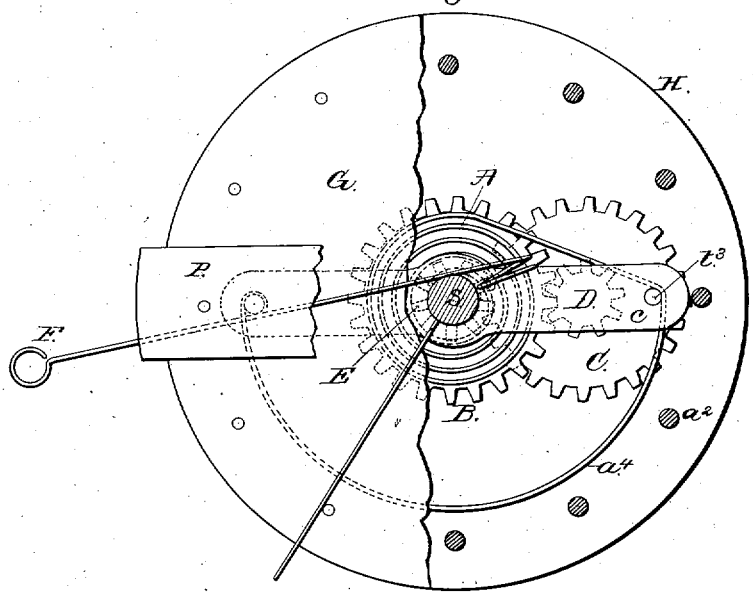

F. A. LOOMIS,

Assignor of one-half to J. S. PLUMB.

FISHERMEN'S REEL.

No. 9,785. Reissued July 5, 1881.

Witnesses
L. F. Connor.
R. J. Noyes.

Inventor.
Francis A. Loomis
by Crosby & Gregory
Attys

UNITED STATES PATENT OFFICE.

FRANCIS A. LOOMIS, OF ONONDAGA, ASSIGNOR OF ONE-HALF TO JAMES S. PLUMB, OF SYRACUSE, NEW YORK.

FISHERMAN'S REEL.

SPECIFICATION forming part of Reissued Letters Patent No. 9,785, dated July 5, 1881.

Original No. 235,157, dated December 7, 1880. Application for reissue filed June 7, 1881.

*To all whom it may concern:*

Be it known that I, FRANCIS A. LOOMIS, of Onondaga, Onondaga county, State of New York, have invented a new and useful Improvement in Fishermen's Reels, of which the following is a specification.

Heretofore reels to be secured to and used in connection with hand-held fishing-rods have been provided with a crank to be operated by one hand when winding up or retrieving the line—a process so slow, even with the most elaborate "multipliers," as to be especially vexatious and wearisome to the fisherman, from the frequent fouling of the flies and hooks when casting where water-grasses abound, near which most of the game fishes in our rivers and lakes choose their haunts. With the crank-reel, which can be turned only at a comparatively slow and irregular speed, the fish is frequently enabled to gain slack line and escape, and by irregular reeling of the line the hook is liable to be torn from the mouth of the fish.

The object of my invention is to avoid these objectionable features by providing a hand-held rod with a reel, by which, when casting at any distance, the flies may be automatically recovered or brought to hand without loss of time, when it is desired, and which shall be as rapid in its action as a game fish is rapid and eccentric in its movements, readily and rapidly taking up the slack or letting it out with a proper stop or tension at all times on the line.

This invention relates to a reel of novel construction, whereby the fish-line may be automatically wound upon, or may be permitted to run from, the reel at the will of the fisherman.

In this my invention the line is wound upon a reel provided with a spring and gearing, so constructed that as the line is drawn from the reel the tension on the spring is more or less increased; or, in other words, the act of unreeling any part of the line for any distance, preparatory to casting the "fly" or hook, further winds the spring, leaving it always in such condition that the reel, when released by the brake, will operate with more or less speed, as the fisherman may desire, to automatically wind the line upon the reel, and this whether or not a fish has taken the fly or hook. The normal condition of the brake is upon the reel, and its force is such as, under ordinary length of line thrown out, to neutralize the effect or tension of the spring in the reel. A fish, having taken the fly or hook and started away from the fisherman, is held by the force of the spring and of the brake; but ordinarily, under such circumstances, the fisherman will, with the same hand on the butt of the rod, release the brake, leaving the fish in his motion checked or resisted only by the strain of the spring of the reel, which strain is very gradually increased by the spring as it is wound, and may be augmented or lessened by the fisherman permitting the brake to touch the reel. If, when at any distance, the fish makes a charge in the direction of his captor, no matter what may be his rate of speed, the reel takes up the line so rapidly that no slack can possibly be obtained. It allows him to come and go alternately at the pleasure of the angler, always subject to a slight draft, until he is forced to surrender.

In case the leader and flies get entangled or the hooks are caught in water-grasses, they can be brought to hand instantaneously or as slowly as the fisherman may desire by a simple movement of one of the fingers of the hand holding the rod.

In case of a miscast, which is liable to occur in a long line in a windy day, its length may be reduced from fifty or sixty feet to fifteen or twenty feet without the loss of a single cast.

When fishing with a rod having a crank-operated reel, movement of the fish toward the fisherman slackens the line, and the fisherman, by his hand not engaged in holding the rod, winds the reel. Under like circumstances, with a rod having my improved automatic reel, the line will be rapidly wound automatically, thus always holding the line taut.

Figure 2:
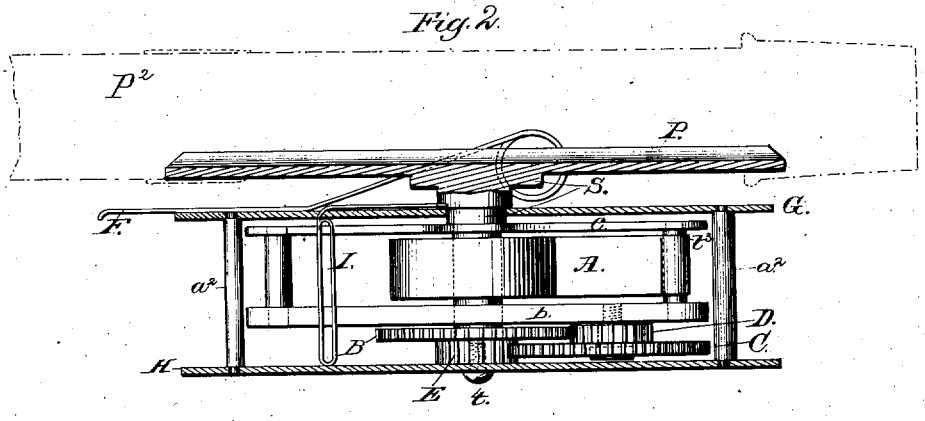

Figure 1 represents an under-side view of one of my improved reels, the reel-plate and part of the lowermost disk or head of the reel being broken away; and Fig. 2 is a longitudinal vertical section, taken through the reel and reel-plate, a part of the rod being shown in dotted lines.

The reel-plate P, having the spindle *s* to receive the reel, is curved or shaped to fit the butt of the fishing-rod $P^2$, as are the ordinary crank-reels.

The reel-spool is composed of two disks or heads, G H, suitably united by connecting rods or bars $a^2$. The stud *s*, on which the spool turns, receives loosely between the disks G H two arms, *b c*. The spool is retained on the stud *s* by the screw *t*. The spring A, which serves to turn the spool and wind the line, is a strong, helical, flat spring, the inner end of which is attached to the stud, while its outer end is attached to one of the pins $t^3$, which connect the arms *b c*. These arms serve to hold the spring in place, and a curved metal band, $a^4$, extending from one end of the arms to the other, controls the expansion of the spring A outward. One of the arms, *b*, has a stud to form an axis for the pinion D, which gears into a spur-wheel, B, fixed to stud *s*, so that when arm *b* is revolved about the central axis the pinion D is turned with a planetary motion.

Affixed to and revolving with pinion D is a spur-wheel, C, of the same size as spur-wheel B. This wheel C gears into a pinion, E, of the same size as D, that revolves on the central axis, *s*, affixed to the plate H, and causes the spool to revolve. By this arrangement of gearing it will be noticed that when the spring A actuates the arms *b c* the spool revolves with an accelerated motion, in accordance with the multiplying gearing placed in a compact form within the revolving spool. When the line is wound upon the spool, to which its inner end should be affixed, drawing off the line causes the spool to revolve against the action of the spring, and the spring is thereby wound up; but when the line is relaxed and the brake (to be described) is lifted the spring gives to the spool a rapid movement in the contrary direction and quickly winds the line, preventing the formation of any slack line. When the line is drawn off the spool for the proper length, preparatory to the casting of the fly or hook, the reel is rotated in a direction to wind the spring A; but reverse rotation of the spool is prevented by a brake, F. This brake is affixed to the central stud, *s*, and projects therefrom in nearly a radial line, bearing against the side of disk G of the spool with force sufficient to prevent its revolving under ordinary strains or by the action of the spring. This brake can be raised to give the spring free action to turn the reel or spool and wind the line, or it can be pressed down with greater force by the hand, to prevent the drawing out of the line, the position of the brake being convenient to be manipulated by the hand grasping the pole. There is also another wire or extended radial arm affixed to the central axis outside the spool and turned at right angles over the face of its periphery, forming at that point a loop, I, that serves as a guide for the line passing through it upon the spool, and prevents its running off while being wound up.

I claim—

1. The rod-plate to fit a fishing rod and reel-holding stud, combined with a spring-actuated reel to automatically wind the line, and a brake adapted to resist the force of the spring of the reel, or to release the reel and permit it to be operated by the spring to automatically wind the line when the strain thereon is not greater than the force of the spring, substantially as and for the purpose described.

2. The combination, with the spring-actuated reel-case and friction-brake to hold it, of the line-guide, substantially as shown and described.

3. In a fisherman's reel, the combination of the spool G H, spring A, stationary wheel B, pinion E, and arm *b*, carrying the planet-wheel C and pinion D, all centering on the axis of rotation of the spool, substantially as and for the purpose specified.

4. In a fisherman's reel, the combination of a spring, A, and spool G H, surrounding and moving about the fixed central stud, *s*, and multiplying and planetary gearing, as shown, with the friction-brake F, bearing against said spool and acted upon by the hand of the operator to control the reeling-in of the line, substantially as described and shown.

FRANCIS A. LOOMIS.

Witnesses:
J. P. MUNROE,
T. L. R. MORGAN.